No. 635,235. Patented Oct. 17, 1899.
E. M. CHRIST.
FIRE ESCAPE.
(Application filed Aug. 16, 1899.)
(No Model.)
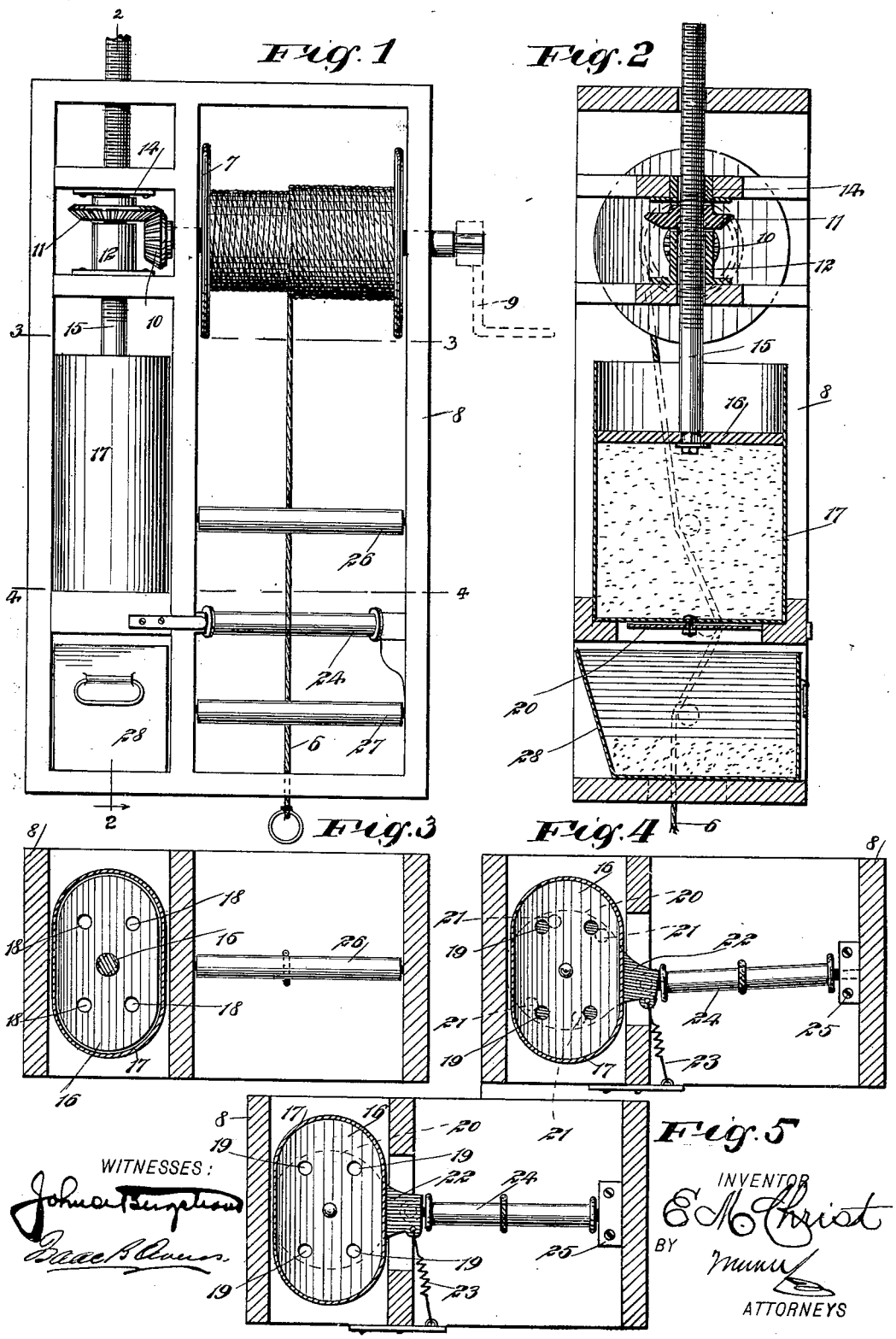

UNITED STATES PATENT OFFICE.

EDWARD M. CHRIST, OF PINE GROVE, PENNSYLVANIA.

FIRE-ESCAPE.

SPECIFICATION forming part of Letters Patent No. 635,235, dated October 17, 1899.

Application filed August 16, 1899. Serial No. 727,413. (No model.)

*To all whom it may concern:*

Be it known that I, EDWARD M. CHRIST, of Pine Grove, in the county of Schuylkill and State of Pennsylvania, have invented a new and Improved Fire-Escape, of which the following is a full, clear, and exact description.

This invention relates to a lowering apparatus adapted to the work of gradually lowering objects of any sort, but especially designed for use as a fire-escape, the apparatus involving a sand-cylinder with a valve-controlled outlet, in which cylinder works a screw-driven follower actuated by the means to which the object to be lowered is attached and serving to retard the movement of such means, such means also actuating the valve of the outlet of the cylinder to regulate the flow of the sand therefrom.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is a section on the line 2 2 of Fig. 1. Fig. 3 is a section on the line 3 3 of Fig. 1. Fig. 4 is a section on the line 4 4 of Fig. 1, and Fig. 5 is a section on the line 4 4 of Fig. 1 with parts in a different position.

The object to be lowered is connected with a rope or other flexible structure 6, which is wound over a spool 7, held in the frame 8 of the apparatus. This spool 7 is provided with a removable hand-crank 9, by which the rope may be wound upon the spool after having been unwound therefrom. The axis of the spool 7 carries a bevel-gear 10, which meshes with a similar gear 11. This gear is held to turn between a bearing-sleeve 12, located at its bottom, and a flanged bushing 14, located at its top. The hub of the gear 11 is threaded and works with a threaded shaft 15, to which is attached a follower 16. This follower is formed with openings 18 therein to permit the passage of the sand or other granular material employed downward below it, and the follower works vertically in a sand-cylinder 17.

The bottom of the sand-cylinder is formed with openings 19 therein, and a valve-plate 20 is pivotally mounted in the longitudinal center of the cylinder below the bottom thereof. This valve-plate is provided with openings 21, which are normally out of registry with the openings 19, as shown in Fig. 4, but which may be thrown into registry with the openings 19, as shown in Fig. 5, by the movement of the valve-plate 20, as described. The valve-plate 20 has an extension 22, to which is connected a spring 23, serving normally to hold the valve-plate in the position shown in Fig. 4. The extension 22 is connected with one end of a roller 24, the other end of which is held loosely in a bearing 25, supported on the frame. Mounted above the roller 24 is a roller 26, and a roller 27 is mounted below the same. The rope 6 is passed behind the rollers 26 27 and in front of the roller 24, so so that when pressure is exerted on the rope and it tends to become taut the roller 24 is thrown laterally, thus throwing the arm 22 and valve 20 and causing the openings 21 to register with the openings 19 to permit the exit of sand from the cylinder 17.

In order to receive the sand as it passes from the cylinder 17, I provide a pan 28, which is located beneath the cylinder and held in the frame 8. This pan is removable, and when it is full of sand it may be lifted to the top of the cylinder and its contents discharged upon the follower 16, from which the sand passes downward below the follower through the openings 18 thereof.

In the operation of my invention the cylinder 17 is filled with the sand or other granular material employed. When the parts are in normal position, the spring 23 will hold the valve 20 closed; but when pressure is applied to the rope 6 it tends to throw the roller 24 to one side, thus uncovering the openings 19 and permitting the sand to pass out of the cylinder. It is clear that the follower 16 cannot descend until the sand begins to run out of the cylinder, and it is also clear that this descent of the follower will be regulated by the amount of sand that falls from the cylinder. The pressure on the rope 6 will maintain the roller 24 steadily at a certain position, which position depends upon the amount of pressure upon the rope, and by these means the sand is permitted to gradually flow from the cylinder and the follower 16 is permitted to gradually descend. The rotation of the spool 7 is controlled by the follower, and consequently the rope 6, with the object to be lowered attached, is caused to descend gradually. The turning of the spool 7 to wind the rope 6 thereon will also result in the reverse movement of the shaft 15—that is to say, the raising of the shaft and the return of the follower to the elevated position.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. The combination of a cylinder, a valve commanding the outlet therefrom, a follower movable in the cylinder and lowering means, the descent of which is controlled by the follower, the lowering means having connection with the valve, to actuate the same.

2. The combination of a cylinder, a valve commanding the outlet therefrom, a follower moving in the cylinder, lowering means, the descent of which is controlled by the follower, such lowering means comprising a rope, and a transversely-movable member having connection with the valve and engaging the rope, to hold the rope laterally out of its straight course, so that when the rope becomes taut it throws said member to actuate the valve.

3. The combination of lowering devices, comprising a rope, means for retarding the lowering device, such means comprising a valve, and a member in connection with the valve to operate the same, the member engaging the rope, to hold the same laterally out of its straight course so that when the rope becomes taut, it moves the member to throw the valve.

4. In a lowering apparatus, the combination with a frame, of a cylinder mounted therein, a follower moving in the cylinder, a threaded shaft having connection with the follower, a gear-wheel held to turn in the frame and having threaded connection with the shaft to move the same longitudinally, a spool geared with the gear-wheel, a rope wound over the spool, a valve commanding the outlet of the cylinder, a roller capable of movement laterally and having connection with the valve to actuate the same, and two additional rollers respectively arranged above and below the first-named roller, the rope being engaged with all of the rollers to hold the rope out of its straight course, so that when tension is applied to the rope it moves the first-named roller laterally to throw the valve.

5. In a lowering apparatus, the combination of a cylinder, a follower working therein, a lowering device in connection with the follower, the descent of the lowering device being regulated by the follower, and valve mechanism regulated by the strain on the lowering device.

EDWARD M. CHRIST.

Witnesses:
W. I. HALDEMAN,
A. M. ZIMMERMAN.